(12) United States Patent
Kawahashi et al.

(10) Patent No.: US 7,130,246 B2
(45) Date of Patent: Oct. 31, 2006

(54) ACOUSTIC FLUID MACHINE

(75) Inventors: Masaaki Kawahashi, Saitama (JP);
Tamotsu Fujioka, Yokohama (JP);
Masayuki Saito, Cincinnati, OH (US)

(73) Assignee: Anest Iwata Corporation (JP)

( * ) Notice: Subject to any disclaimer, the term of this patent is extended or adjusted under 35 U.S.C. 154(b) by 227 days.

(21) Appl. No.: 10/893,773

(22) Filed: Jul. 16, 2004

(65) Prior Publication Data

US 2006/0013071 A1    Jan. 19, 2006

(51) Int. Cl.
*G01V 1/145* (2006.01)
(52) U.S. Cl. .................................... 367/143
(58) Field of Classification Search ............... 367/143; 181/262; 91/50
See application file for complete search history.

(56) References Cited

U.S. PATENT DOCUMENTS 3,605,555 A * 9/1971 Wise .............................. 91/50

* cited by examiner

*Primary Examiner*—Dan Pihulic
(74) *Attorney, Agent, or Firm*—McKee, Voorhees & Sease, P.L.C.

(57) ABSTRACT

An acoustic fluid machine has an acoustic resonator and a piston reciprocated by an actuator at the base of the acoustic resonator. A valve device is provided on the upper end of the acoustic resonator. External air is introduced into the acoustic resonator through the valve device. The piston has through-holes, through which front space communicates with rear space thereby reducing load applied onto the piston.

6 Claims, 9 Drawing Sheets

ACOUSTIC FLUID MACHINE

BACKGROUND OF THE INVENTION

The present invention relates to an acoustic fluid machine on the basis of acoustic resonance in an acoustic resonator.

There is a known acoustic fluid machine in which a piston is reciprocated axially with minute amplitude at high speed in a larger-diameter base of an acoustic resonator so that a gas is sucked at the upper end into the acoustic resonator and discharged with pressure change in the acoustic resonator.

The acoustic fluid machine is utilized by amplitude pressure change of acoustic standing waves generated by resonance with the piston that reciprocates axially with minute amplitude, and the piston in the base of the acoustic resonator is reciprocated at high speed by an actuator.

The structure is simple and malfunction is difficult to occur. The acoustic fluid machine is expected to be used widely in the future.

However, in the acoustic fluid machine, a gas is sucked and discharged only by the piston which vibrates minutely, and there is a basic problem that compression ratio and flow rate obtained is relatively small. To obtain high-pressure high-flow-rate, it is necessary to lighten the piston and to increase output of the actuator. But if the piston is lighten, strength will become poor, and if output of the actuator is increased, it will increase cost for manufacturing the actuator.

SUMMARY OF THE INVENTION

In view of the disadvantages, it is an object of the present invention to provide an acoustic fluid machine to decrease load applied to a piston, thereby obtaining a high-pressure discharge gas by an ordinary actuator.

BRIEF DESCRIPTION OF THE DRAWINGS

The features and advantages of the invention will become more apparent from the following description with respect to embodiments as shown in appended drawings wherein.

DETAILED DESCRIPTION OF PREFERRED EMBODIMENTS

Figure 1:
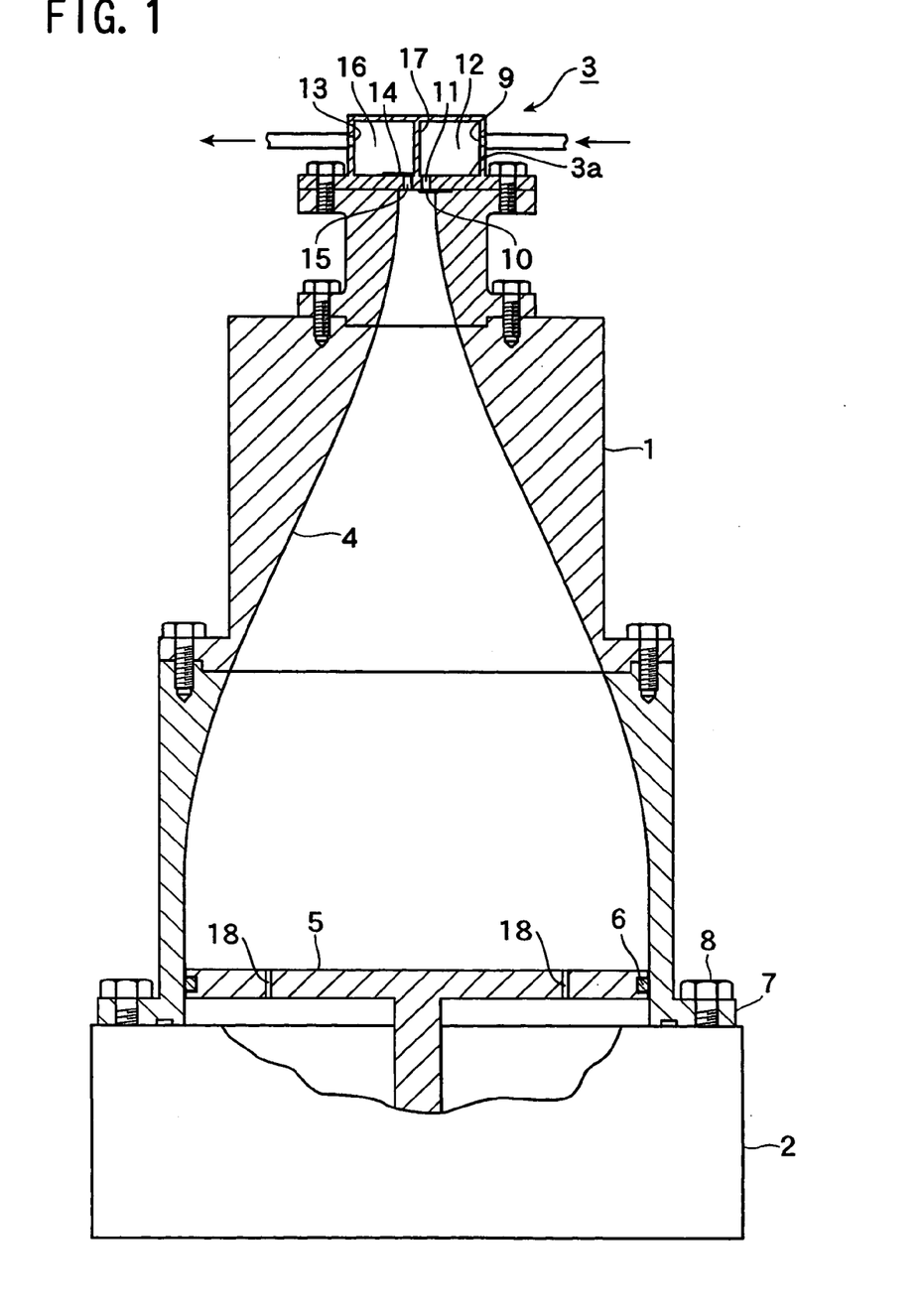
FIG. 1 is a vertical sectional front view of the first embodiment of an acoustic fluid machine according to the present invention.

FIG. 1 shows a vertical sectional view of the first embodiment of an acoustic fluid machine according to the present invention.

The acoustic fluid machine has an acoustic resonator 1, an actuator 2 at a larger-diameter base of the acoustic resonator 1, and a valve device 3 at the smaller-diameter upper end.

The acoustic resonator 1 has a resonant cavity 4 having the larger-diameter lower end and smaller-diameter upper end, and the resonant cavity 4 has an inner surface to comply with the following formula:

$$r(x) = \frac{r_p - r_o}{2}\cos\left(\frac{\pi}{L}x\right) + \frac{r_p + r_o}{2}$$

where L is the length of the resonant cavity, $r_p$ is the radius of the lower end or base of the actuator and $r_o$ is the radius of the upper end or sucking or discharging upper end.

The actuator 2 is also a support, and has a piston 5 reciprocated by the actuator 2. The piston 5 is made of light alloy and fitted in the lower end of the resonant cavity 4. A seal 6 is fitted in the outer circumference of the piston 5. The acoustic resonator 1 has an outward flange 7 at the lower end, and the outward flange 7 is superimposed on the upper surface of the actuator 2. The outward flange 7 is fixed to the actuator 2 by a suitable number of bolts 8.

The valve device 3 comprises a suction chamber 12 and a discharger chamber 16 side by side. The suction chamber 12 has an inlet 9 and a sucking bore 11 which has an inward check valve 10 at a lower surface of the bottom wall. The discharge chamber 16 has an outlet 13 and a discharge bore 15 which has an outward check valve 14 at an upper surface of the bottom wall. The suction chamber 12 is partitioned from the discharge chamber 16 by a partition wall 17.

The inward and outward check valves 10 and 14 comprise reed valves of thin steel plates fixed to the lower surface of the bottom wall of the suction chamber 12 and to the upper surface of the bottom wall of the discharge chamber 15 respectively, or rubber plate valves. They may comprise ball-type or others.

Valve-opening resistance of the outward check valve 13 is much higher than that of the inward check valve 10.

Drive frequency of the actuator 2 is controlled by a function synthesizer (not shown) with the accuracy of about 0.1 Hz.

The piston 5 is reciprocated axially at minute amplitude at a larger-diameter base of the lower end of the acoustic resonator 1. When the pressure amplitude in the acoustic resonator is very small, external air is introduced into the suction chamber 12 through the inlet 9 and forwarded into the acoustic resonator 1 through the suction bore 11 and inward check valve 10. When the pressure amplitude in the acoustic resonator 1 is very large, the air is forwarded to the discharge chamber 16 through the discharge bore 15 and outward check valve 14 and discharged under pressure from the discharge chamber 16 through the outlet 13.

As mentioned above, valve-opening resistance of the outward check valve 14 in the discharge bore 15 is much higher than that of the inward check valve 10 in the sucking bore 11.

Thus, at the beginning of operation, the air sucked by the piston 5 into the resonant cavity 4 through the sucking bore 11 and the inward check valve 10 is not discharged through the discharge bore 15 at once, and only after the pressure in the resonant cavity 4 exceeds a certain value, the outward check valve 14 is opened, so that the air is discharged through the discharge bore 15 and outlet 13.

Accordingly, density of a gas that is sucked into and discharged from the resonant cavity 4 is increased, thereby achieving high discharge pressure and discharge amount.

According to the present invention, there are a plurality of smaller-diameter holes 18 around the center.

When the piston 5 is vibrated axially at high speed, a gas closer to the piston 5 partially passes through the holes 18 to the opposite side of the piston 5, so that pressure that acts on the front and rear surfaces is reduced.

Therefore, it allows the piston 5 to be made of light thinner material thereby increasing its life and decreasing the size of the actuator 2.

Figure 2:
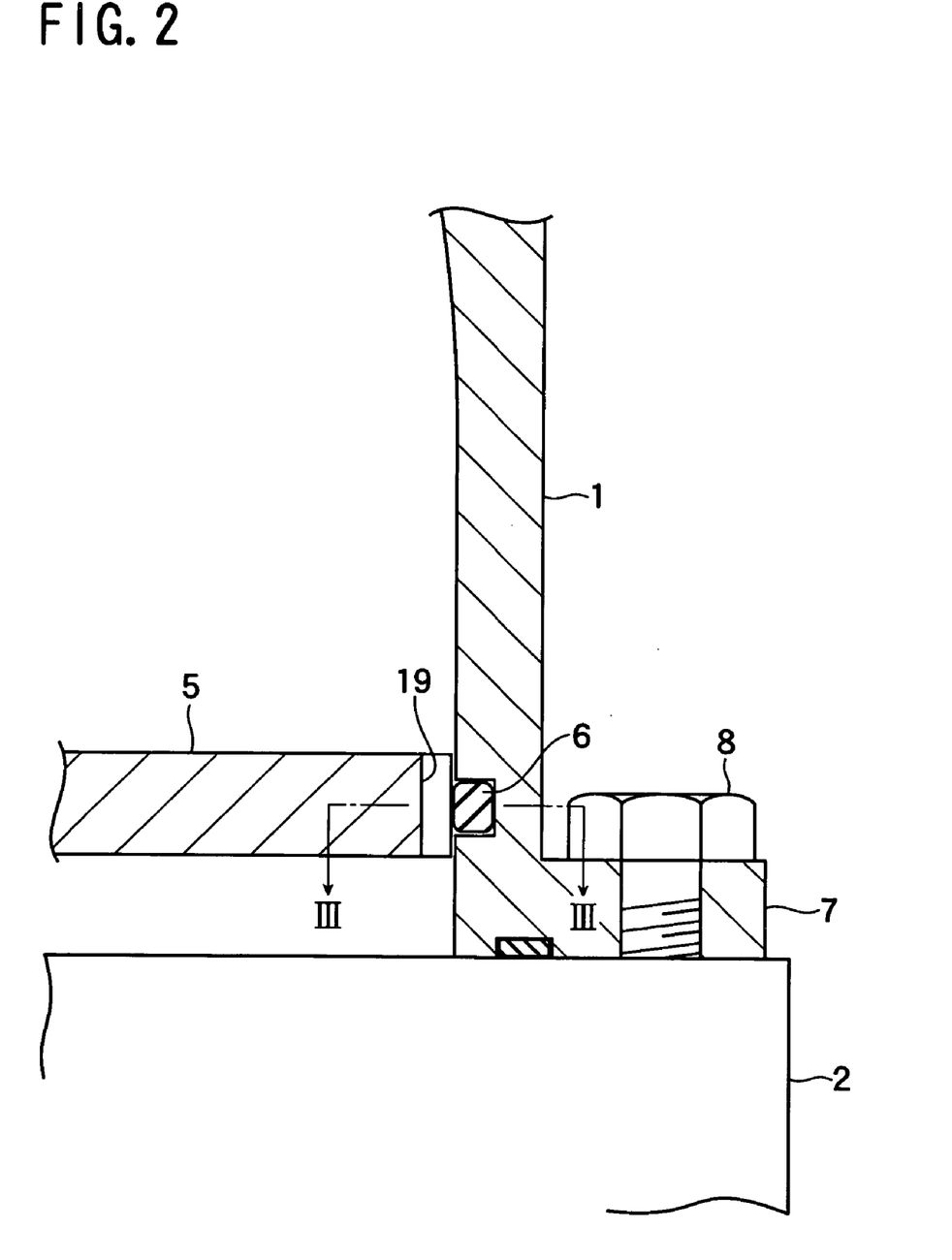
FIG. 2 is an enlarged vertical sectional view of the second embodiment of an acoustic fluid machine according to the present invention.
Figure 3:
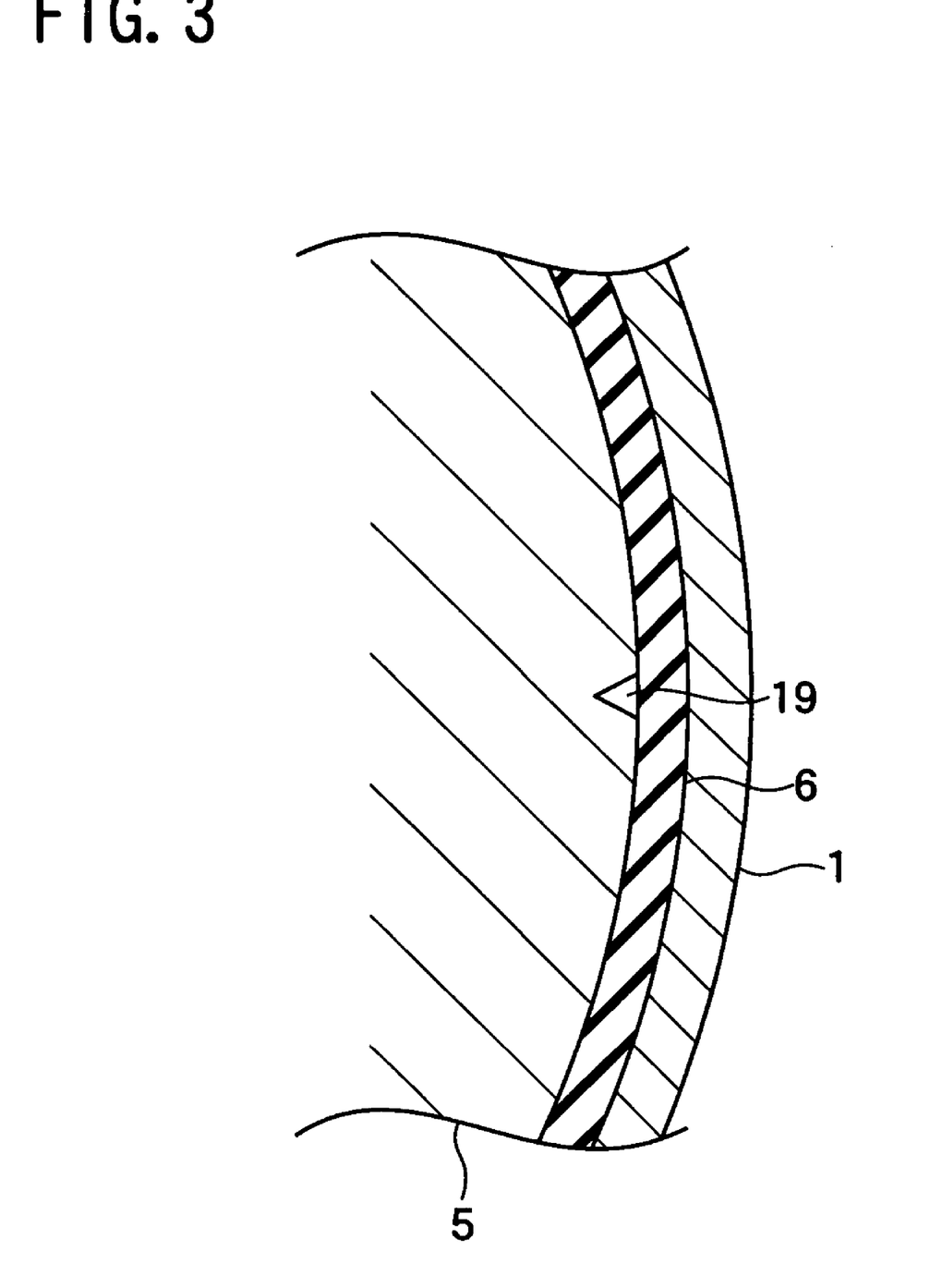
FIG. 3 is a horizontal sectional view taken along the line III—III in FIG. 2.

FIG. 2 is an enlarged vertical sectional view of the second embodiment according to the present invention, and FIG. 3 is a horizontal sectional view taken along the line III—III in FIG. 2. The basic structure is similar to that in FIG. 1, and only differences will be described.

A suitable number of grooves 19 are formed on the outer circumferential surface of a piston 5 and a seal 6 is provided on the inner surface of the acoustic resonator 1.

Through the grooves 19, front and rear spaces of the piston 5 communicate with each other, and the object of the invention can be achieved.

Figure 4:
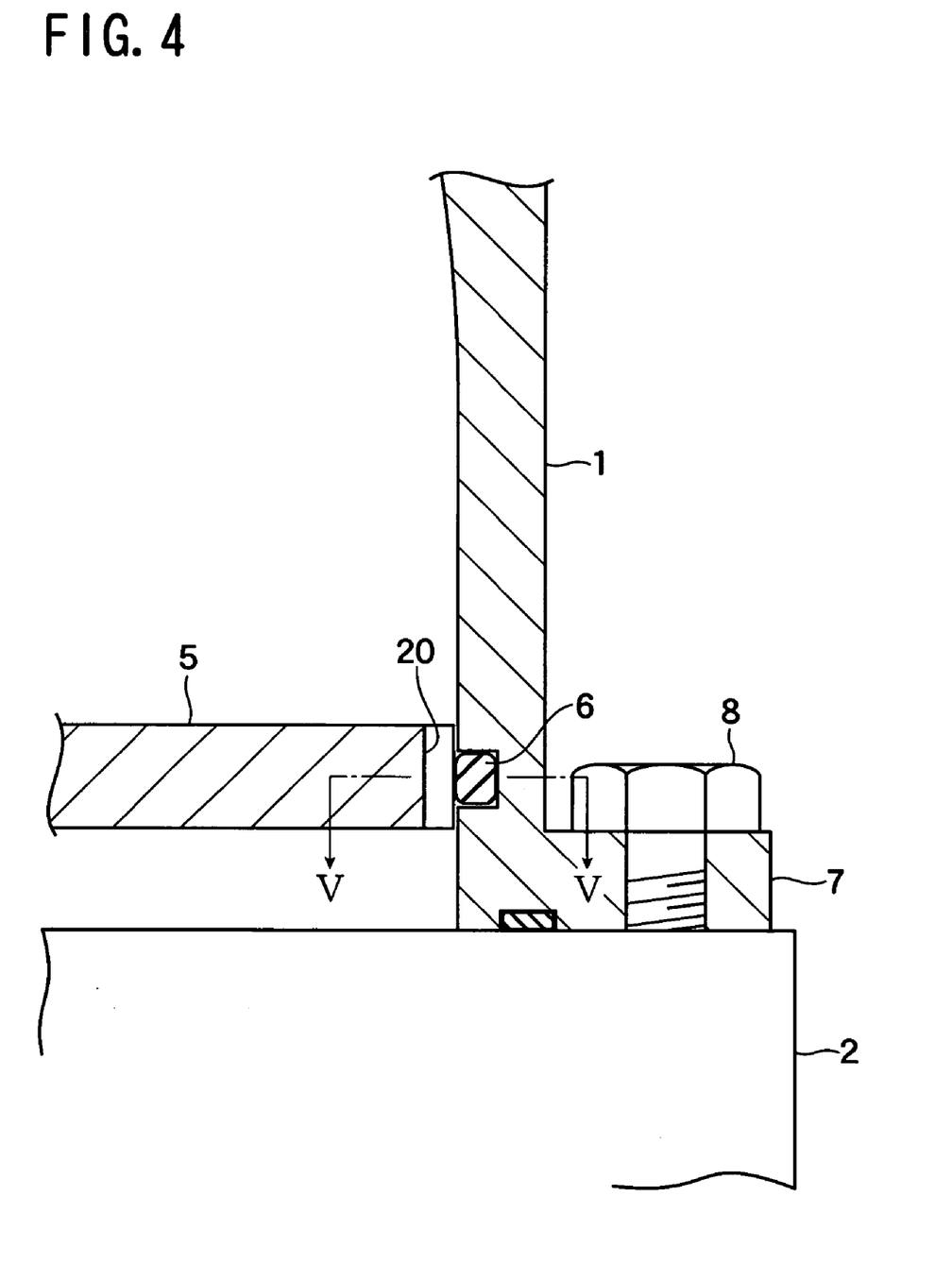
FIG. 4 is an enlarged vertical sectional view of the third embodiment of an acoustic fluid machine according to the present invention.
Figure 5:
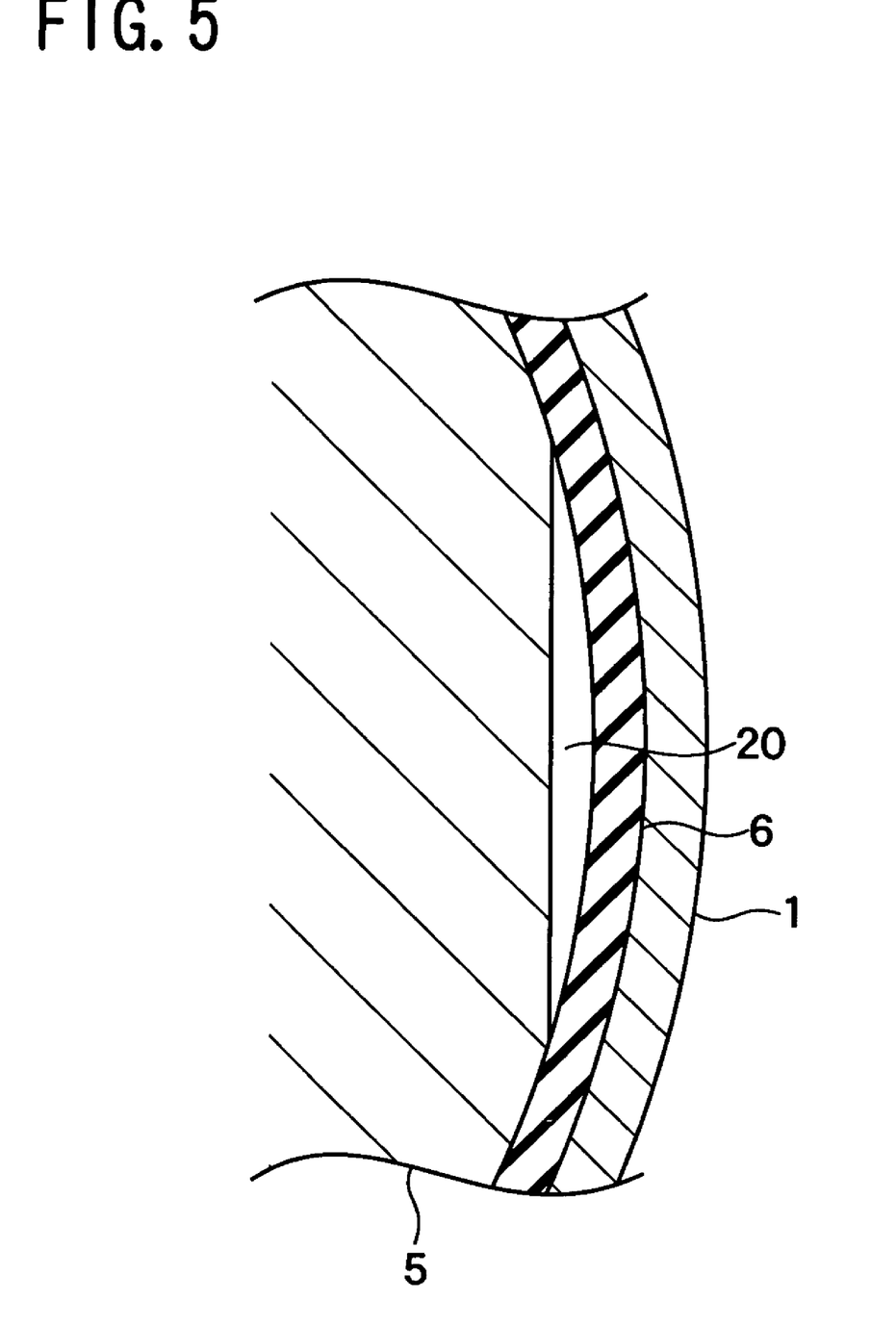
FIG. 5 is a horizontal sectional view taken along the line V—V in FIG. 4.

FIG. 4 is an enlarged vertical sectional front view of the third embodiment of the present invention, and FIG. 5 is a horizontal sectional view taken along the line V—V in FIG. 4.

A recess 20 is formed on the outer circumferential surface of a piston 5, and a seal 6 is fitted in the inner circumferential surface of an acoustic resonator 1. Through the recess 5, front and rear spaces of the piston 5 communicate with each other, and the object of the invention can be achieved.

Figure 6:
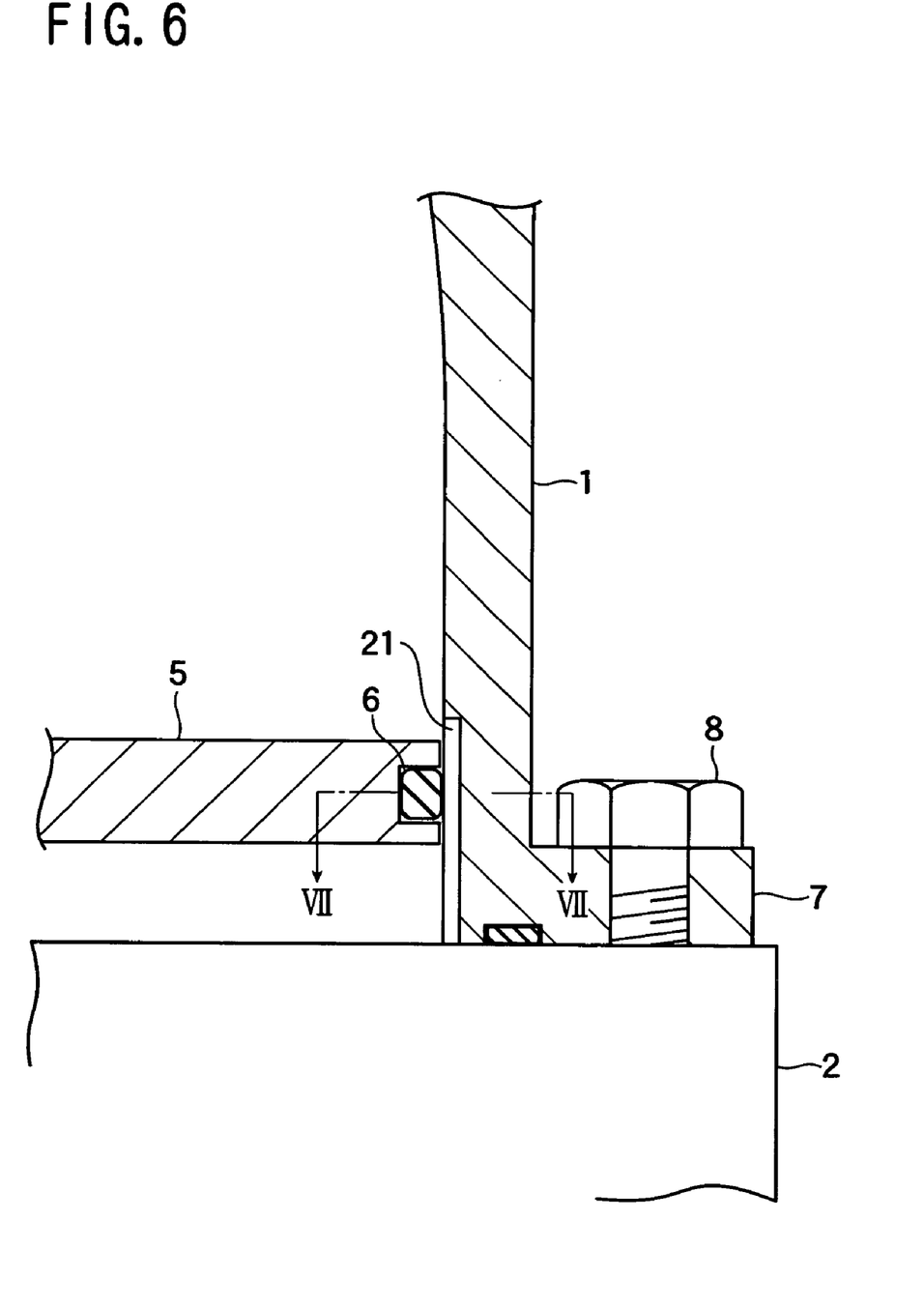
FIG. 6 is an enlarged vertical sectional view of the fourth embodiment of an acoustic fluid machine according to the present invention.
Figure 7:
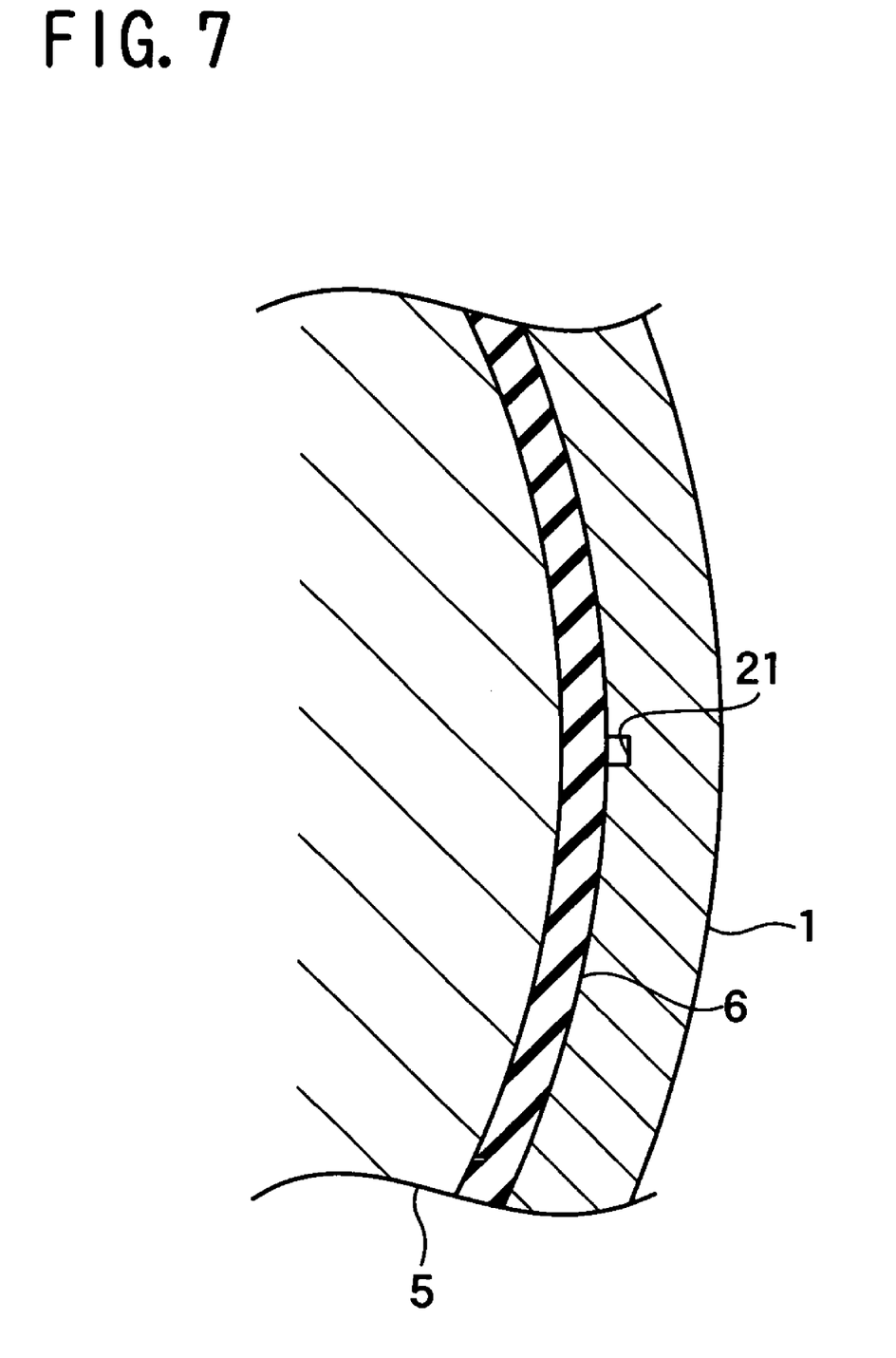
FIG. 7 is a horizontal sectional view taken along the line VII—VII in FIG. 4.

FIG. 6 is an enlarged vertical sectional view of the fourth embodiment of the present invention and FIG. 7 is a horizontal sectional view taken along the line VII—VII in FIG. 6.

Slightly beyond the region where a piston 5 reciprocates, a suitable number of grooves 21 are formed on the inner circumferential surface of an acoustic resonator 1, and a seal 6 is fitted in the outer circumferential surface of the piston 5.

Front and rear spaces of the piston 5 communicates to each other through the grooves 21, and the object of the invention can be achieved.

Figure 8:
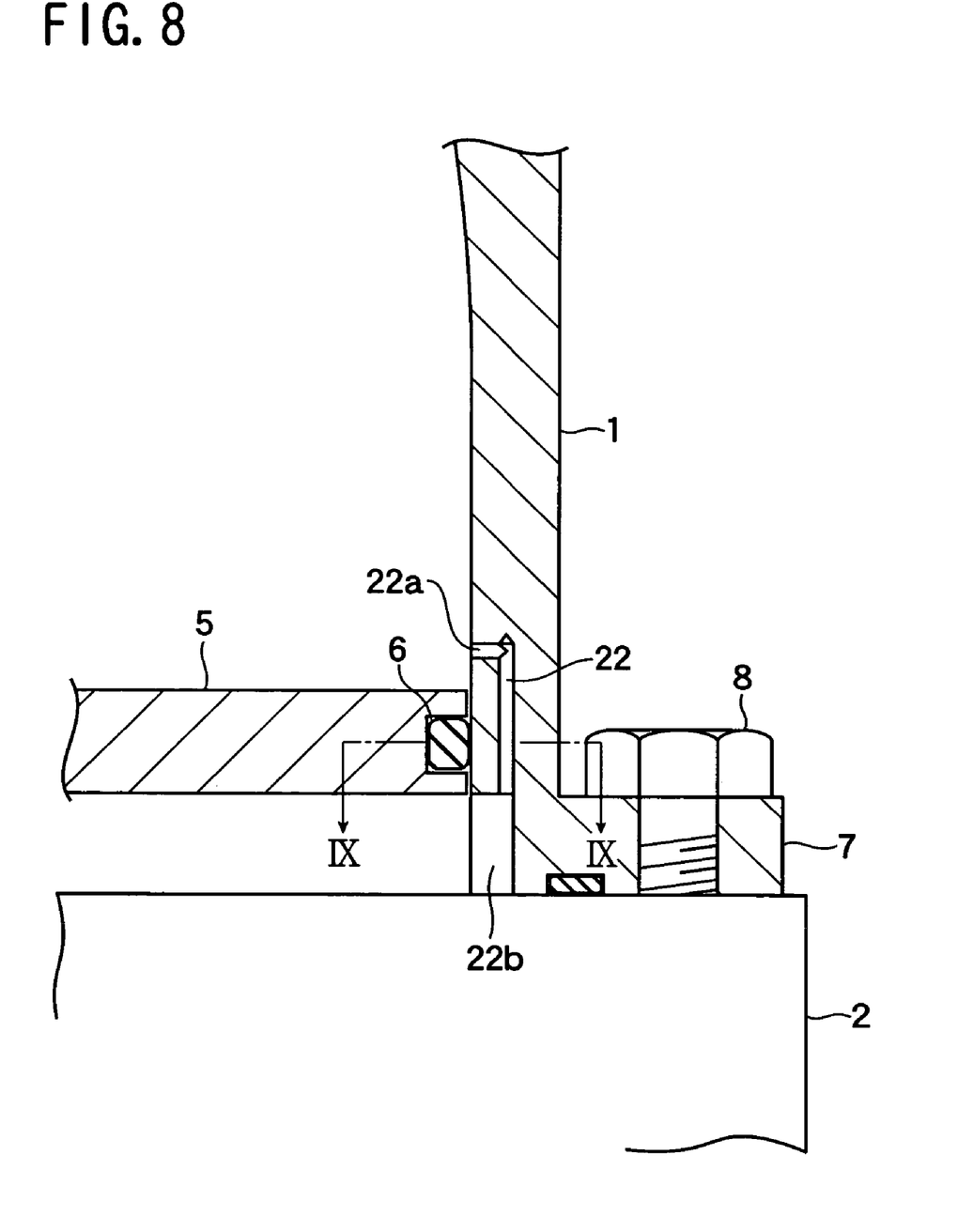
FIG. 8 is an enlarged vertical sectional view of the fifth embodiment of an acoustic fluid machine according to the present invention.
Figure 9:
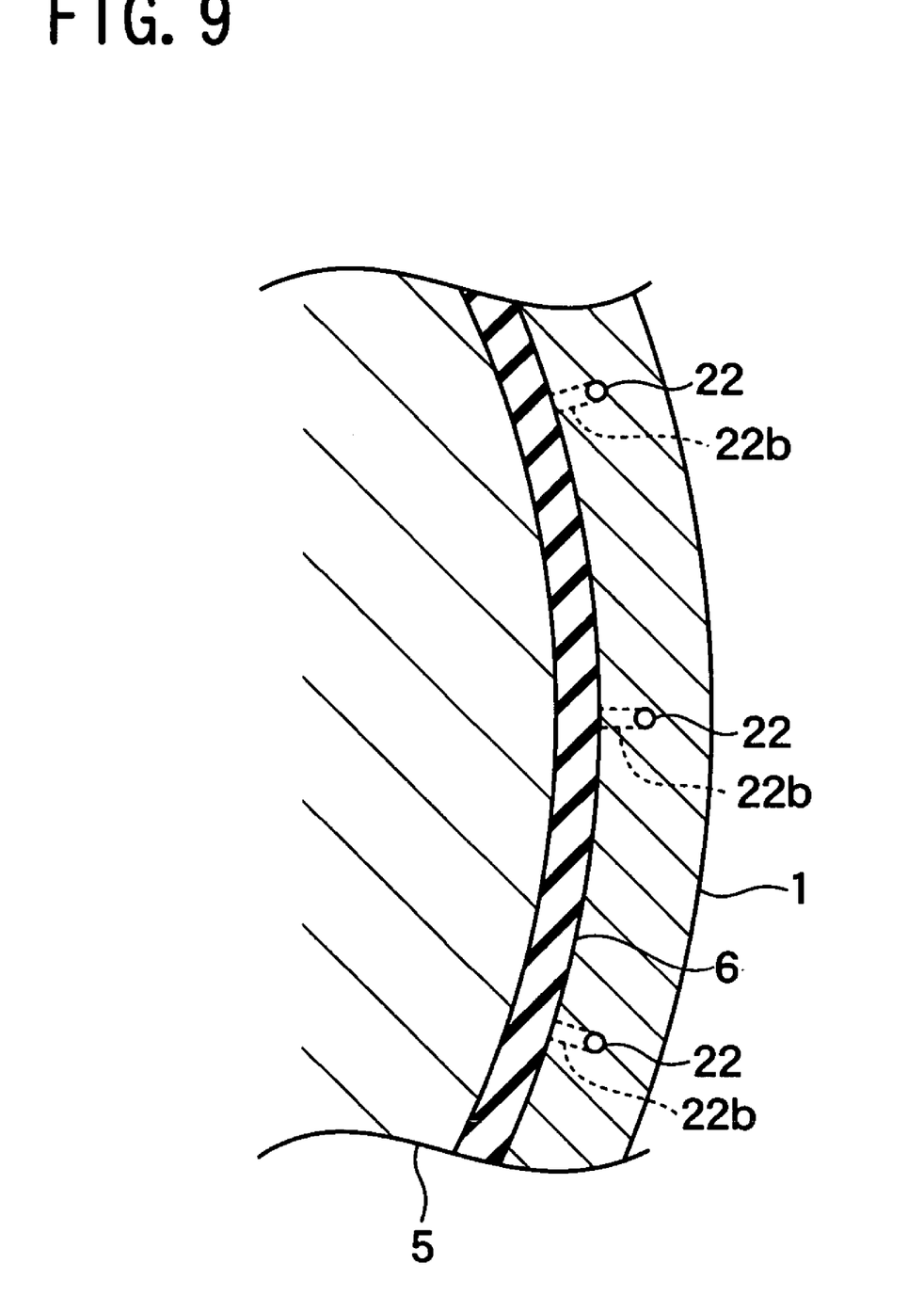
FIG. 9 is a horizontal sectional view taken along the line IV—IV in FIG. 8.

FIG. 8 is an enlarged vertical sectional view of the fifth embodiment of the present invention and FIG. 9 is a horizontal sectional view taken along the line IX—IX in FIG. 8.

Slightly beyond the region where a piston 5 reciprocates, a bore 22 is formed in the inner circumferential surface of an acoustic resonator 1 so that front and rear spaces of the piston 5 communicate with each other. The bore 22 comprises an upper part 22a and a lower part 22b. A seal 6 is fitted in the outer circumferential surface of the piston and the object of the invention can be achieved.

Instead of the bore 22, a tube may be fixed on the outer circumferential surface of the acoustic resonator 1.

The foregoing merely relates to embodiments of the invention. Various modifications and changes may be made by a person skilled in the art without departing from the scope of claims wherein:

What is claimed is:

1. An acoustic fluid machine comprising:
an acoustic resonator;
a piston in a base of the acoustic resonator, a hole being formed through the piston;
an actuator connected to the piston to reciprocate the piston to vibrate a gas in the acoustic resonator;
a valve device at an upper end of the acoustic resonator; and
front and rear spaces of the piston communicating with each other by the hole through the piston to reduce pressure applied to the piston.

2. An acoustic fluid machine comprising:
an acoustic resonator having a groove in an inner circumferential surface;
a piston in a base of the acoustic resonator;
an actuator connected to the piston to reciprocate the piston to vibrate a gas in the acoustic resonator;
a valve device at an upper end of the acoustic resonator; and
front and rear spaces of the piston communicating with each other via the groove in the inner circumferential surface of the acoustic resonator to reduce pressure applied to the piston.

3. An acoustic fluid machine comprising:
an acoustic resonator having a bore in a surrounding wall;
a piston in a base of the acoustic resonator;
an actuator connected to the piston to reciprocate the piston to vibrate a gas in the acoustic resonator;
a valve device at an upper end of the acoustic resonator; and
front and rear spaces of the piston communicating with each other through the bore in the surrounding wall of the acoustic generator to reduce pressure applied to the piston.

4. An acoustic fluid machine comprising:
an acoustic resonator;
a piston in a base of the acoustic resonator;
an actuator connected to the piston to reciprocate the piston to vibrate a gas in the acoustic resonator;
a valve device at an upper end of the acoustic resonator;
front and rear spaces of the piston communicating with each other to reduce pressure applied to the piston; and
a seal being provided between an outer circumferential surface and the piston and an inner circumferential surface of the acoustic resonator.

5. An acoustic fluid machine as claimed in claim 1 wherein a recess is formed on an outer circumferential surface of the piston.

6. An acoustic fluid machine as claimed in claim 1 wherein a groove is formed on an outer circumferential surface of the piston.

* * * * *